US006923291B2

(12) United States Patent
Paulsson

(10) Patent No.: US 6,923,291 B2
(45) Date of Patent: Aug. 2, 2005

(54) APPARATUS FOR DETECTING GEOPHYSICAL ENERGY

(75) Inventor: Björn N. P. Paulsson, Fullerton, CA (US)

(73) Assignee: Paulsson Geophysical Services, Inc., Brea, CA (US)

( * ) Notice: Subject to any disclaimer, the term of this patent is extended or adjusted under 35 U.S.C. 154(b) by 270 days.

(21) Appl. No.: 10/373,646

(22) Filed: Feb. 24, 2003

(65) Prior Publication Data

US 2003/0217886 A1 Nov. 27, 2003

Related U.S. Application Data

(63) Continuation-in-part of application No. 09/789,327, filed on Feb. 20, 2001, now Pat. No. 6,568,501, which is a continuation-in-part of application No. 09/394,465, filed on Sep. 11, 1999, now Pat. No. 6,206,133, which is a continuation-in-part of application No. 09/038,856, filed on Mar. 11, 1998, now Pat. No. 5,962,819.

(51) Int. Cl.$^7$ ................................................ G01F 1/16
(52) U.S. Cl. ........................................ 181/122; 181/113
(58) Field of Search .......................... 181/122, 113–121, 181/101–112

(56) References Cited

U.S. PATENT DOCUMENTS 5,962,819 A * 10/1999 Paulsson ..................... 181/102
6,568,501 B2 * 5/2003 Paulsson ..................... 181/102

* cited by examiner

Primary Examiner—Kimberly Lockett
(74) Attorney, Agent, or Firm—John S. Reid; Reidlaw, L.L.C.

(57) ABSTRACT

One embodiment of the invention provides for an apparatus for detecting geophysical energy. The apparatus includes a receiver configured to receive geophysical energy and to convert the geophysical energy into a signal. The apparatus further includes a signal transport device configured to accept the signal and relay the signal to a remote location. The apparatus also includes a fluid conduit configured to contain a pressurized fluid, a production tubing, and an expansible section disposed inline in the fluid conduit. The expansible section is positioned between the production tubing and the receiver, and is configured to expand in response to an increase of fluid pressure within said conduit. When expanded, the expansible section presses against the production tubing and the receiver and thereby causes the receiver to be moved from a first position to a second position.

17 Claims, 13 Drawing Sheets

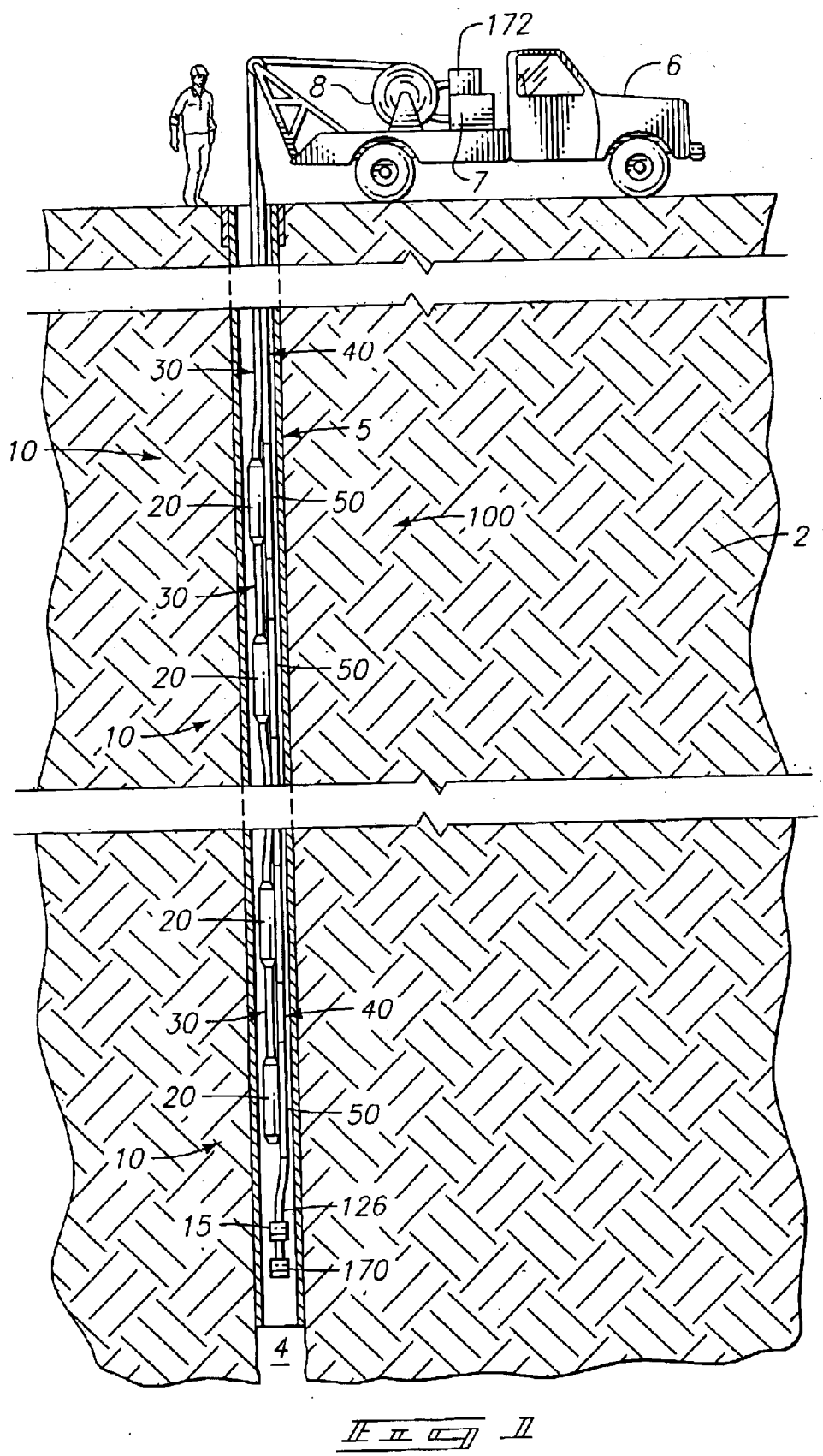

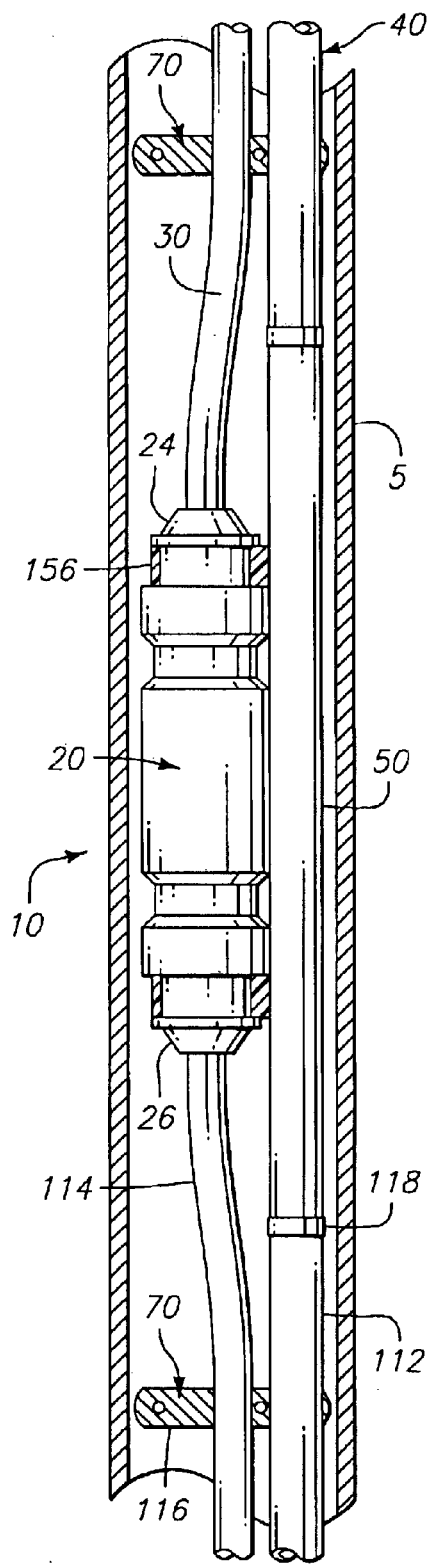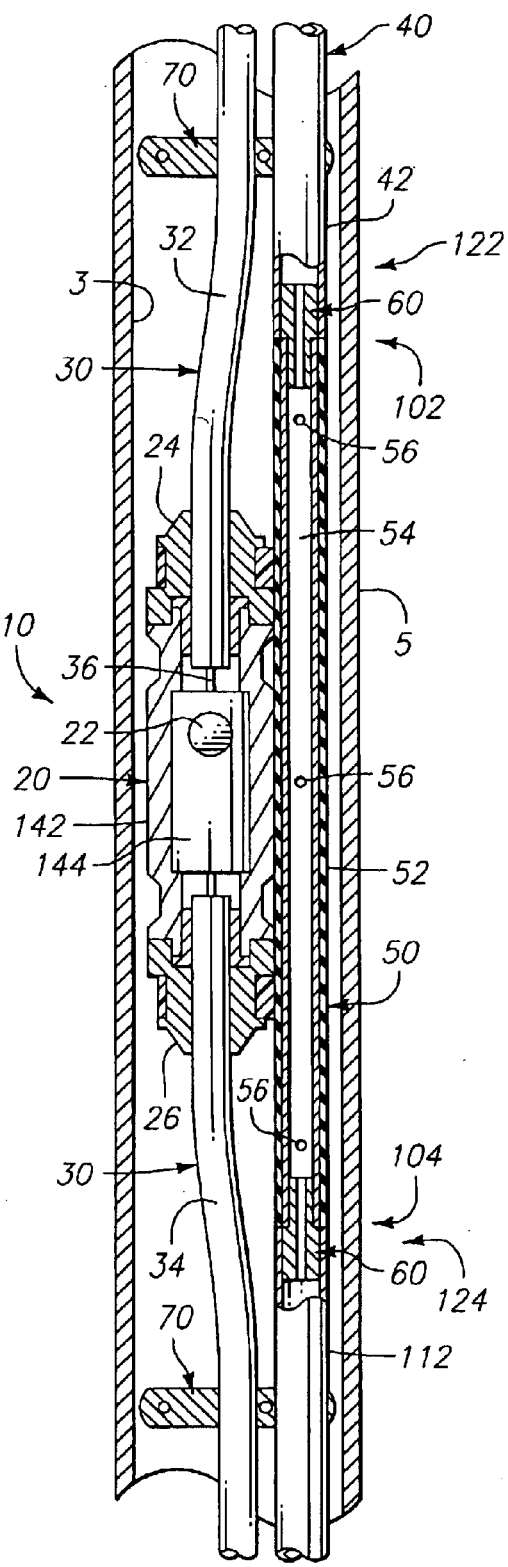

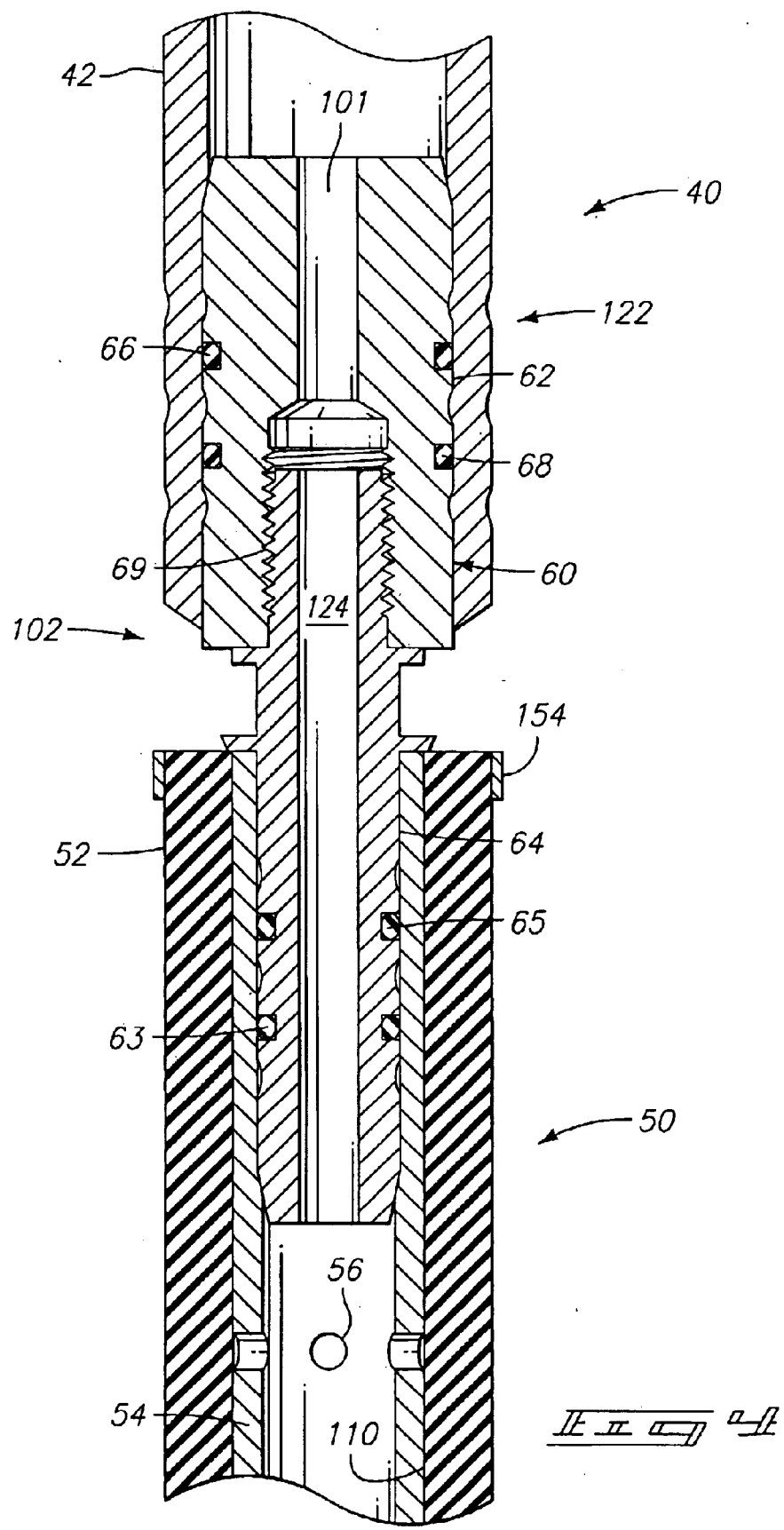

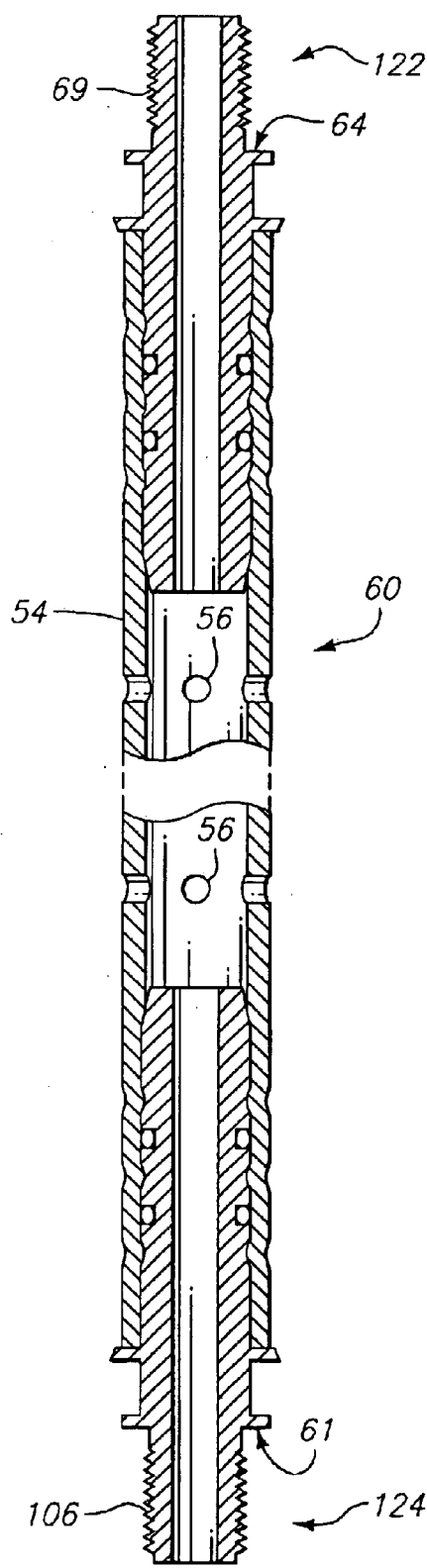
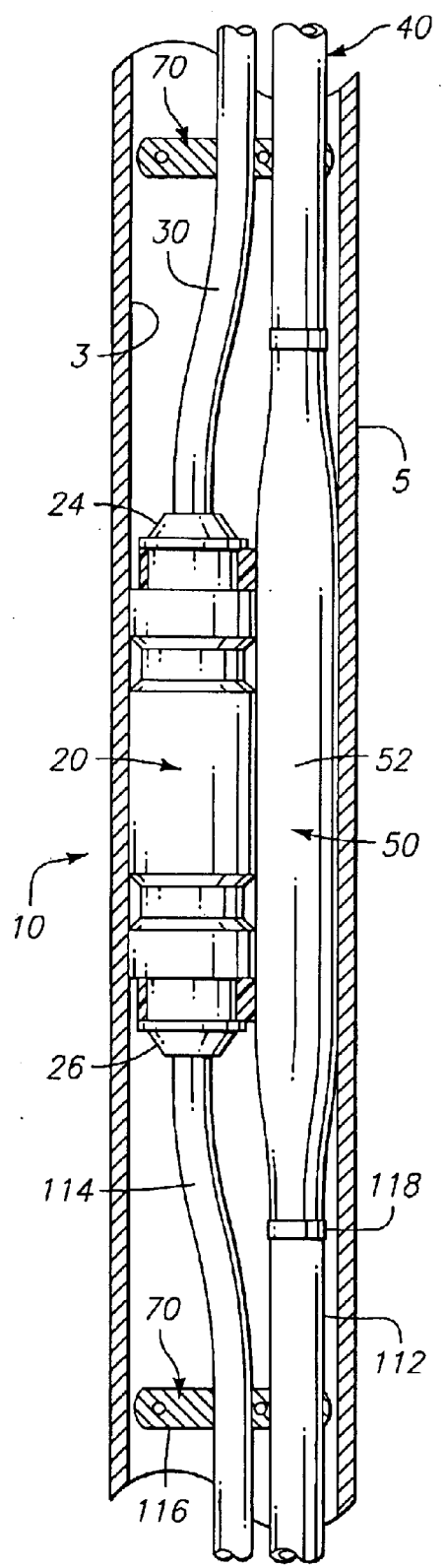

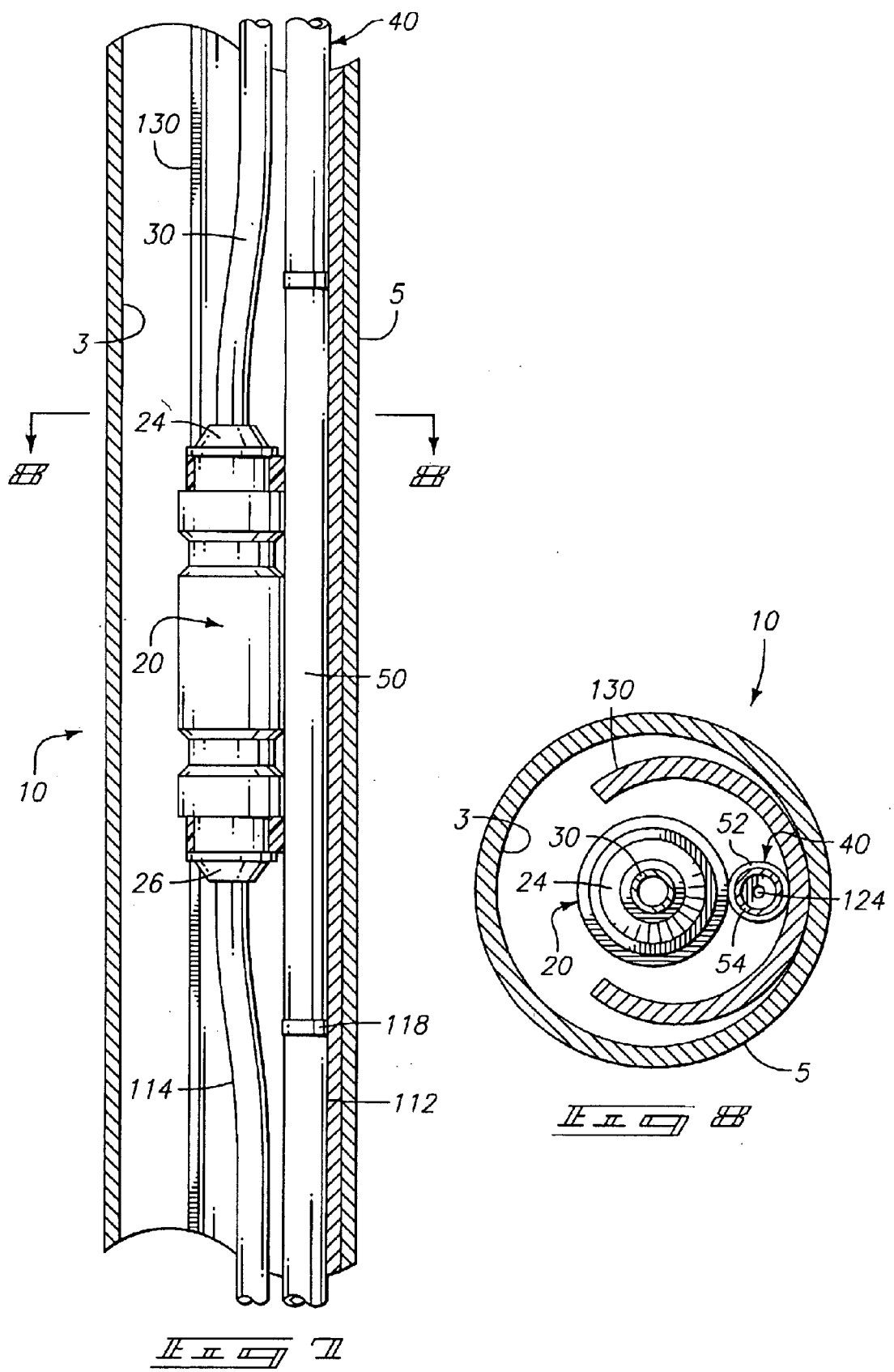

US 6,923,291 B2

APPARATUS FOR DETECTING GEOPHYSICAL ENERGY

CROSS REFERENCE TO RELATED APPLICATIONS

This application is a continuation-in-part of U.S. patent application Ser. No. 09/789,327, filed Feb. 20, 2001, now U.S. Pat. No. 6,568,501, which is in turn a continuation-in-part of U.S. patent application Ser. No. 09/394,465, filed Sep. 11, 1999, now U.S. Pat. No. 6,206,133, which is in turn a continuation-in-part of U.S. patent application Ser. No. 09/038,856, filed Mar. 11, 1998, now U.S. Pat. No. 5,962,819.

TECHNICAL FIELD

This invention relates to the field of geophysical seismic receivers, and more particularly to downhole and marine bottom geophysical receiver arrays.

BACKGROUND OF THE INVENTION

An emerging area in the field of seismology is the area of borehole seismology. In traditional seismology, both a source and sensors have been either located at the surface, or the sensors ("receivers") have been located downhole while the source has been located on the surface. In borehole seismology, the source is placed in a borehole while the receivers can be either on the surface, or preferably in a borehole as well. This later mode is known as "cross-well seismology." Borehole seismology is particularly useful in determining the condition of an existing reservoir, following the history of a producing reservoir, and exploring potential new reservoirs. Borehole seismology also makes it possible to routinely record shear waves, which allows for mapping lithology of oil and gas reservoirs.

A limiting factor in borehole seismology has been the lack of receiver arrays for boreholes which provide the dense spatial sampling required to make use of the high seismic frequencies made possible by the consolidated geologic formation. Shear ("S") waves, for example, have only half the wave length of compressional ("P") waves, further increasing the need for dense spatial sampling. The recording of compressional waves as well as polarized shear waves makes it possible to map the mechanical properties of oil and gas reservoirs, as well as map and distinguish between different fluids and the effect of lithology. This information can also be used to map differential field stresses, which is the primary source for differential permeability in a reservoir. Further, high signal to noise ratios, as well as a dense spatial sampling, allow for direct use of attenuation of compressional and shear waves for characterization of oil and gas reservoirs. This combination of seismic measurements allows much more information to be extracted about the true nature of oil and gas reservoirs.

In order to record and collect this required volume of measurements from borehole seismology, what is needed is a seismic receiver array which can be deployed within a borehole and which has the capability of detecting both compressional and shear waves, as well as transmitting this information from the borehole to the surface where it can be further collected and/or processed. However, the borehole environment makes it difficult to record useful seismic data for borehole seismology. Merely lowering an array of hydrophones into a borehole is typically insufficient to record the data necessary for useful borehole seismology. Hydrophones are susceptible to recording energy from tube wave noise, which can obscure useful seismic signals. Further, in a gas-filled well hydrophones are useless, as the gaseous fluid in the borehole does not conduct the energy from the borehole to the hydrophone.

Therefore, what is needed is a receiver which can be used for borehole seismology. More particularly, what is needed is a receiver array which can be deployed within a borehole and which will record shear and compressional waves useful in characterizing the reservoir, as well as transmit the received data to a surface location where it can be utilized.

BRIEF DESCRIPTION OF THE DRAWINGS

Preferred embodiments of the invention are described below with reference to the following accompanying drawings, wherein:

FIG. 1 is an environmental view showing one embodiment of a receiver array described herein deployed within a borehole in a reservoir.

FIG. 2 is a side elevation view showing one embodiment of a portion of a receiver array described herein deployed within a borehole.

FIG. 3 is a sectional view of the receiver array shown in FIG. 2.

FIG. 4 is a side elevation detail of an expansible section connector which can be used in the receiver array described herein.

FIG. 5 is a sectional detail of an expansible section connector which can be used in the receiver array described herein.

FIG. 6 is a side elevation view showing the receiver array of FIG. 2 in a activated position wherein the receiver is coupled to the borehole wall.

FIG. 7 is side elevation view of an alternate embodiment of the receiver array shown in FIG. 2.

FIG. 8 is a top sectional view of the receiver array shown in FIG. 7.

SUMMARY

Figure 9:
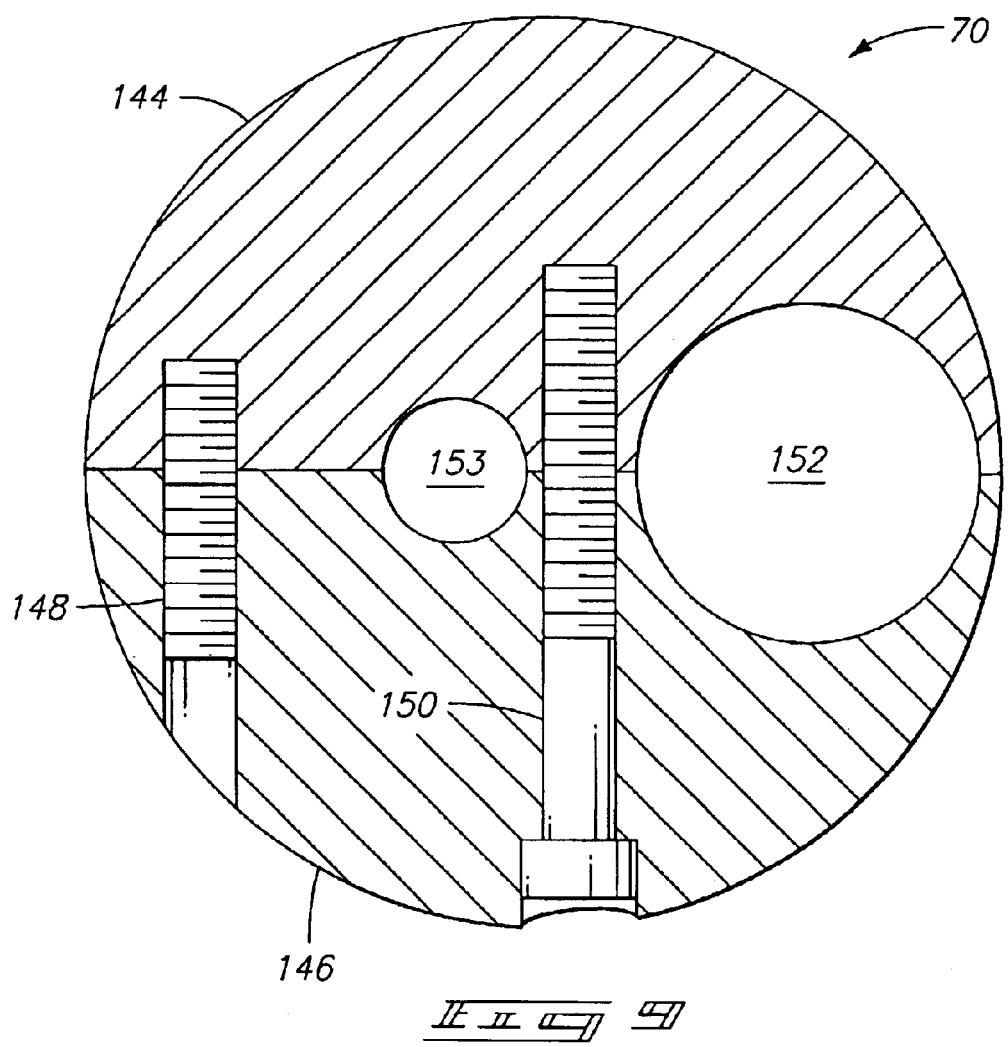
FIG. 9 is a sectional view of a positioning device which may be used in a receiver array as described herein.

One embodiment of the invention provides for an apparatus for detecting geophysical energy. The apparatus includes a receiver configured to receive geophysical energy and to convert the geophysical energy into a signal. The apparatus further includes a signal transport device configured to accept the signal and relay the signal to a remote location. The apparatus also includes a fluid conduit configured to contain a pressurized fluid, a production tubing, and an expansible section disposed inline in the fluid conduit. The expansible section is positioned between the production tubing and the receiver, and is configured to expand in response to an increase of fluid pressure within said conduit. When expanded, the expansible section presses against the production tubing and the receiver and thereby causes the receiver to be moved from a first position to a second position.

DETAILED DESCRIPTION

An apparatus for detecting geophysical energy is described herein. The apparatus includes a receiver, a signal transport device, and a fluid conduit having a receiver deployment section located proximate to the receiver. An increase of fluid pressure within the fluid conduit causes the receiver deployment section to actuate, pressing the receiver to a surface, such as the wall of a wellbore or an ocean bottom surface, allowing improved signal reception by the receiver.

The apparatus can include a plurality of receivers and a common fluid conduit, the common fluid conduit having a plurality of receiver deployment sections located proximate to each receiver, such that an increase of pressure within the fluid conduit will cause essentially simultaneous actuation of all of the receiver deployment sections. Thus, when the receiver array is located within a borehole, for example, the receiver deployment sections can all be actuated at an essentially common instant to cause the receivers to be clamped within the wellbore at essentially the same time. The fluid conduit 40 can be fabricated from tubing such as production tubing. The fluid conduit can also be fabricated from coiled tubing, which can be deployed from a spool as shown in FIG. 1. The receiver deployment sections can be considered as packer elements when the array is disposed in a wellbore. Thusly, in certain embodiments the apparatus can be described as a clamped receiver array using production tubing conveyed packer elements.

In the receiver array embodiment, a large number of receivers can be coupled together over a long distance, for example 1,000 meters (m) or more. Thus, when the receiver array is deployed within a borehole, a support mechanism can be provided to support the weight of the receiver array while it is in an unclamped position. One embodiment of the invention described herein incorporates tensile strength members to eliminate the need for a separate support mechanism to support the weight of the apparatus within a wellbore. When the receiver array is deployed within a wellbore and the receiver deployment section includes an expansible section, local receivers, and the outer surface of an expansible section proximate to the receiver, will normally be exposed to localized pressures within the wellbore. One method of causing the expansible section to expand and move the receiver into contact with the wellbore wall is to increase the pressure within the fluid conduit to a pressure greater than that within the wellbore at that point. Thus, a differential pressure is generated to actuate the apparatus to cause coupling of the receiver with the wellbore. A similar result is achieved for other types of receiver deployment sections disclosed herein. In one embodiment, the apparatus includes a flow or pressure fused valve located at the end of the fluid conduit which is disposed within the wellbore to allow fast acting response of the receiver deployment sections in response to a pressure increase within the fluid conduit over the local pressure within the wellbore.

FIG. 1 shows an exemplary clamped receiver array 100 in an environmental view wherein the receiver array is deployed within a wellbore 5 in an earth formation 2. In the embodiment shown in FIG. 1, the apparatus 100 can properly be described as a downhole clamped receiver array. The receiver array 100 has a plurality of receiver sections 10 having receivers 20 connected by a common signal cable 30. Essentially parallel to the signal cable 30 is the fluid conduit 40. The fluid conduit 40 has expansible sections 50 located adjacent to receivers 20. The expansible sections act as the receiver deployment sections in this embodiment. In this embodiment fluid conduit 40 is fabricated in-part from coil tubing such that the apparatus can be wound onto a spool 8 which can be supported by a vehicle 6, allowing easy transportation and deployment of the apparatus within a wellbore. Although in the preferred embodiment a plurality of receivers and expandable sections are employed in the apparatus, it is understood that the apparatus can be constructed and deployed using only a single receiver and a single expansible section. For exemplary purposes only, a signal cable 30 can be provided with between 20 and 2000 receivers spaced between about 0.3 m and 60 m apart.

Turning now to FIG. 2, a detail of the apparatus 100 of FIG. 1 (indicated as 10 in FIG. 2) having a single receiver 20, associated fluid conduit 40, and expansible section 50 is depicted as being deployed within a wellbore having a casing 5. The apparatus 10 of FIG. 2 can include positioning devices 70 which are useful in positioning and protecting the receiver 20 and the fluid conduit 40 within the casing 5. Centralizing the receiver 20 and the fluid conduit 40 within the casing 5 is beneficial to reduce unwanted contact between these components while the apparatus 100 is being inserted into the casing. Such unwanted contact can cause damage to the apparatus 10, and is therefore undesirable. The positioning device 70 can also be utilized to connect the signal cable 30 to the fluid conduit 40 to reduce relative movement there between. In one embodiment of the invention wherein only a single receiver is employed, the signal cable section 114 and the fluid conduit section 112 are terminated shortly below positioning device 116. In a first variation on the single receiver embodiment, the signal cable section 114 and the fluid conduit section 112 are absent or terminated just below the receiver second end 26 and the expansible section second end 118, respectively.

In an alternate embodiment of the apparatus, several receivers 20 can be connected to the signal cable 30 between expansible sections 50. That is, receiver arrays wherein certain receivers are not provided with dedicated expansible sections can be employed.

Turning now to FIG. 3, a cross-sectional view of the apparatus 10 of FIG. 2 is shown. The major components of the apparatus 10 shown in FIG. 3 are the receiver 20, the signal cable 30, the fluid conduit 40, and the expansible section 50. The expansible section 50 is connected to fluid conduit sections 42 and 112 by expansible section connector 60. The apparatus 100 of FIG. 1 can further include an orienting device 170, which can comprise a gyroscopic orienting apparatus. Orienting device 154 is useful for determining the compass direction of the apparatus 100 in the borehole 5. Each component will now be described in further detail.

The Receiver

The receiver 20 is a receiver configured to receive geophysical energy and generate signals in response thereto which are representative of certain characteristics associated With the geophysical energy. The signals can be recorded for later processing. The geophysical energy can be characterized by such characteristics as frequency, amplitude, polarization, and the direction of propagation of the energy wave associated with the geophysical energy. The receiver 20 can support sensors 22 which can be 3-component or 3-dimensional geophones. Such geophones record geophysical seismic energy moving in a vertical direction, as well as in a first and a second horizontal direction. One example of sensors used in a receiver in the present invention are 30 Hz, 3-component geophones having a frequency range of 10 Hz to 1,000 Hz and being digitized with a sample rate of between and including 2 ms and ¼ ms. In addition to the 3-component sensor described, 1, 2, or 4-component sensors can also be employed.

In one example, the receiver 20 includes a polyurethane pod or casing 142 having a diameter of 7 cm and a length of approximately 30 to 36 cm. The geophones 22 can be epoxied within the casing 142. The geophones 22 can further be potted in a semi-rigid rubber/plastic compound to absorb thermal and pressure strain on the geophone holder 144. Holder 144 can be fabricated from aluminum. The geophone holder 144 can be potted with R828 Epon epoxy, available from Shell Chemical Company.

Figure 10:
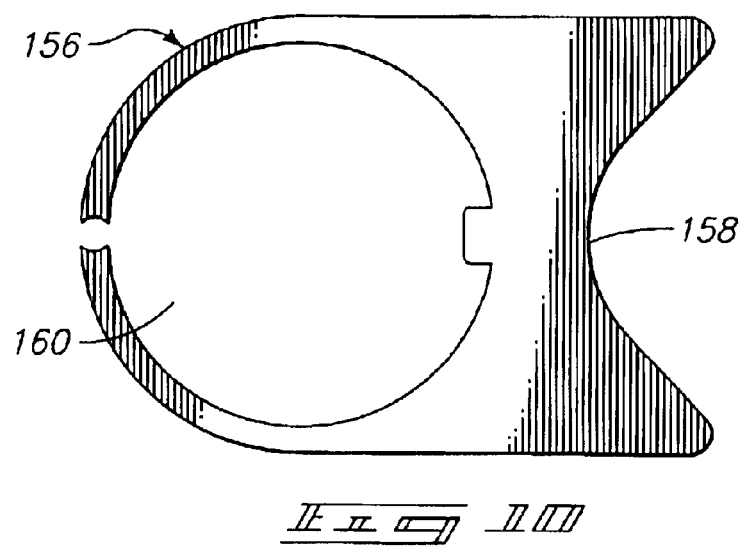
FIG. 10 is a plan view of a positioning ring used to maintain the position of the receiver relative to the expansive element.

The receiver 20 is held in relative position to the expansible section 50 by positioning device 70, as described below. The receiver 20 of FIG. 3 can include locator rings 156 which are configured to prevent the receiver 20 from moving laterally with respect to the fluid conduit 40. Locator ring 156, shown in detail in FIG. 10, includes an opening 160 to receive receiver 20, and a concave portion 158 to receive the expansible section 50.

Signal Cable

In response to geophysical energy received by sensor 22, the receiver 20 produces a signal which can then be communicated to a remote location, such as to a surface location where the signal can be recorded or further processed. A device for communicating the signal can include the signal cable 30 of FIG. 3. Other signal transmitting devices can be employed, such as radio transmission. The signals can be transmitted to recorder 172 of FIG. 1.

Signal cable 30 further includes a signal conductor 36. Examples of signal conductors 36 are metal wires or optical fibers. For example, in a receiver array having 80 3-component receivers resulting in 240 channels for data transmission, a 256 twisted pair cable was used for the signal conductors. The twisted pairs were of #28 wire with thin braided shield around the bundle. The wires were coated with a dual copolymer/polypropolene insulation rated at 176□C (350□F). The cable was jacketed with double extruded polyurethane jacket, each layer having a thickness of 2.3 mm. The signal cable in the example further included a central Kevlar strength member having a 1600 kg break strength.

Signal cable 30 can be an analog cable with each sensor 22 hard-wired directly to the remote location (as for example the surface). Alternately, the sensors 22 can be locally digitized and the digital data or signal can be multiplexed and sent to the remote location on multiplexed signal conductors 36. The benefit of using multiplexed signal conductors is that a lesser number of signal conductors is required. For example, in the example described herein wherein 240 sensors were employed, 256 twisted pairs were used. However, when the sensors are provided with digitizers to digitize the signal, and 4 signal channels are used, then a 64 twisted pair signal conductor arrangement can be employed. Multiplexing can be performed with optical fiber conductors as well.

Fluid Conduit

The fluid conduit 40 of FIG. 3 is used to communicate a fluid to the receiver deployment section, shown here as expansible section 50. The fluid can be used to actuate the receiver deployment section. For example, the fluid in the conduit 40 can expand the expansible section 50 causing the receiver 20 to be pressed up against the inner wall 3 of the borehole casing 5. This is shown graphically in FIG. 6 where receiver 20 has been pushed up against the inner side wall 3 due to expansion of the resilient sleeve 52 which comprises a part of expansible section 50 and fluid conduit 40. Other embodiments of receiver deployment sections, and their techniques for being actuated by fluid within the fluid conduit 40, will be discussed further below.

In one embodiment, the fluid conduit 40 includes a continuous piece of coil tubing having resilient expansible sleeves such as rubber bladders placed over the outside of the tubing at expansible section locations 50. In those positions where the rubber bladder is placed over the coil tubing, the tubing is provided with holes or openings to allow fluid within the fluid conduit to be forced outside of the fluid conduit, thus causing the rubber bladder 52 to expand and push the receiver 20 into the casing 5. In this embodiment, the rubber bladder 52 is secured to the coiled tubing by metal straps 154 of FIG. 4. Fluid conduit 40 can be a length of standard tubing or a length of coiled tubing. An embodiment wherein production tubing is used is discussed further below.

Coil tubing has the benefit of being capable of deployment into the well from an industry standard coiled tubing rig, as indicated in FIG. 1. Such rigs allow the tubing to be wrapped on a spool rather than pieced together by individual straight pipe lengths. This allows a simpler deployment of the apparatus in the field. Preferably, the coiled tubing is between about 2.3 cm and 7.9 cm (0.9 in. and 3.1 in.) in diameter. The only practical limit on the length of coiled tubing which can be employed is the weight which must be supported by the coiled tubing when it is deployed within a borehole. Coiled tubing lengths of 9000 meters and greater can be employed in the apparatus disclosed herein.

In a first embodiment of the fluid conduit 40 described above, the receiver deployment section includes a resilient sleeve 52 disposed about the outside diameter of a continuous piece of coiled tubing as shown in FIG. 3. In this embodiment, non-continuous segments of coiled tubing are used between expansible sections 50. Expansible sections are preferably provided with a resilient sleeve 52 having an uninflated outside diameter approximately equal to the outside diameter of the coil tube 42. In this way, a constant diameter for the fluid conduit 40 can be maintained, allowing ease of spooling of the fluid conduit, it being appreciated that when a resilient sleeve 52 having an outside diameter greater than the outside diameter of the coiled tube 42 is used, the fluid conduit will not be spooled in a smooth continuous manner.

The fluid conduit 40 can further include an expansible section connector 60 which can be provided with an expansible section tensile member 54 as shown in FIG. 4.

Positioning Device

A positioning device 70 shown in FIG. 3 which can be used in the embodiment described herein is shown in further detail in FIG. 9. FIG. 9 shows a plan view of the positioning device 70 of FIG. 3. The positioning device 70 comprises a first half 144 and a second half 146 which are coupled together by fasteners 148 and 150, which can comprise threaded couplers. When coupled together, the first half 144 and the second half 146 define a first opening 152 which can receive fluid conduit 40 of FIG. 6, and a second opening 153 which can receive the signal cable 30. In this manner, the fluid conduit 40 can be held in relative position to signal cable 30 and hence receiver 20. This allows the receiver 20 to be accurately positioned with respect to the receiver deployment section, here, expansible section 50.

In addition to positioning the receiver in the wellbore, the positioning device is also useful in dampening noise ("tube waves") in the wellbore, which can be conducted by casing 5 of FIG. 1.

Expansible Section

As described above, in one embodiment the receiver deployment section 10 includes an expansible section. Turning to FIG. 4, a detail of the upper end 122 of the expansible section 50 of the fluid conduit 40 shown in FIG. 3 is provided in detail. The expansible section 50 includes an expansible sleeve 52 which is preferably a resilient sleeve. The sleeve 52 can be fabricated from any material having a tendency to expand when subjected to a differential pressure and preferably returned to its original size and shape once the applied pressure has been removed. The resilient sleeve 52 can also be described as a "rubber bladder" (although the material of fabrication might not actually be rubber). One exemplary material of construction for the sleeve 52 is a nitrile elastomer. In one example the resilient sleeve 52 is fabricated from nitrile having a hardness of duro 60. An alternate material of construction for the resilient sleeve 52 is vinylidene flouride hexafluorpropylene tetrafluorethylene, available from E. I. du Pont de Nemours and Company as "Viton", having a hardness of duro 60.

The resilient sleeve 52 is coupled to the main tubing section 42 of the fluid conduit 40 by the expansible section connector 60. The expansible section connector 60 includes tubing end fitting 62 and expansible section connector end fitting 64. Expansible section connector 60 can further include expansible section tensile member 54. Tubing end fitting 62 securely engages the primary tubing 42. One method for such secure engagement is to swage the end of tubing 42 over the tubing end fitting 62. Another method to secure the tube 42 to the end fitting 62 is by welding. O-rings 66 and 68 can be provided to facilitate a fluid-tight seal between the coiled tubing 42 and the tubing end fitting 62.

The expansible section tensile member 54 can be securely held in place against the expansible section end fitting 64 by an appropriate method as a swage fitting. O-rings 63 and 65 can be employed to facilitate a fluid-tight seal between expansible section tensile member 54 and expansible section connector end fitting 64.

Tubing end fitting 62 can be securely engaged by expansible section connector end fitting 64 by a method such as threads 69. Expansible sleeve 52 is preferably disposed about the outer diameter of expansible section tensile member 54 and the exposed portion of expansible section connector end fitting 64. The expansible sleeve 52 can be securely held in such position by a metal strap 154, which can be fabricated from stainless steel, for example. In this manner, the fluid conduit 40 provides a continuous strength member to support the apparatus 10 when it is deployed for example within a wellbore. As seen in FIG. 4, this also provides a constant outside diameter for the fluid conduit 40.

In operation, fluid within fluid conduit 40 passes into the expansible section connector 60 by way of fluid passage 101 which is disposed in the coiled tubing end fitting 62. Expansible section connector end fitting 64 is likewise provided with a fluid passage 124 allowing fluid to pass into the expansible section tensile member 54. The expansible section tensile member 54 can be a piece of regular production tubing or a coiled tubing section. In one example, tubing section 42 is a 3.8 cm (1.5 in. nominal) diameter coiled tubing, and expandable section tensile member 54 is a 2.5 cm (1 in. nominal) diameter coiled tubing section.

The hollow tubing used for expandable section tensile member 54 can be provided with holes 56 allowing fluid to pass from within the fluid conduit 40 into the space 110 between the outside diameter of the expandable section tensile member 54 and the resilient sleeve 52. When the fluid pressure within the fluid conduit 40 is increased beyond the pressure at the outside diameter of the expandable sleeve 52, the expandable sleeve 52 is caused to expand in an outward manner, thus pushing against the receiver 20 of FIG. 3 and causing the receiver 20 to move against the inner wall 3 of the casing 5.

Turning to FIG. 5, a side elevation view of the expandable section connector 60 of FIG. 4 is depicted. Upper end 122 and lower end 124 are shown with respect to similar upper and lower ends of FIG. 3. The expandable section connector 60 has a first expandable section connector end fitting 64 and a second expandable section connector end fitting 61. Connected to, by swaging or welding, each of the expandable section connector end fittings 61 and 64 is expandable section tensile member 54, which here is a 2.5 cm diameter (1 in. nominal) hollow coiled tubing section 54. Advantageously, the threads 69 in the first expandable section connector end fitting 64 can be provided in a first direction, while the threads 106 in the second expandable section connector end fitting 61 can be provided in a second direction. For example, thread 69 can be right hand threads while threads 106 are left hand threads. In this example, the expandable section connector 60 can be rotated in a single direction to engage tubing end fittings at each end of the expandable section connector 60. When the expandable section connector 60 is rotated in the opposite direction, the tubing end fittings 61, 64 at each end of the expandable section connector 60 will be disengaged from the connector 60. This has the beneficial effect of allowing expandable sections 50 to be removed from the fluid conduit 40 without the need to rotate one end or the other of the fluid conduit 40 with respect to the expandable section 50. This beneficial feature can be utilized for example to replace expandable sleeves 52 which may become damaged or worn in use.

Outer Sleeve

In yet an alternate embodiment, the signal cable 30, receivers 20, and the fluid conduit 40, can be received within a secondary tubing. This is shown in side elevation view in FIG. 7 and in a plan sectional view in FIG. 8, wherein the secondary tubing is indicated by reference numeral 130. When the receiver deployment sections are actuated, (e.g., when expansible sections 50 within the fluid conduit 40 expand), the receivers 20 will be pushed out of the secondary tubing 130 into contact with the inner wall 3 of the casing 5. In this embodiment, the secondary tubing 130 essentially acts as a protective outer sleeve in which the apparatus 10 is protectively contained until such time as the apparatus is to be activated within the borehole. Once the pressure within the expansible section 50 is reduced, the receivers 20 and signal cable 30, retract back into the secondary coiled tubing 130.

Figure 11:
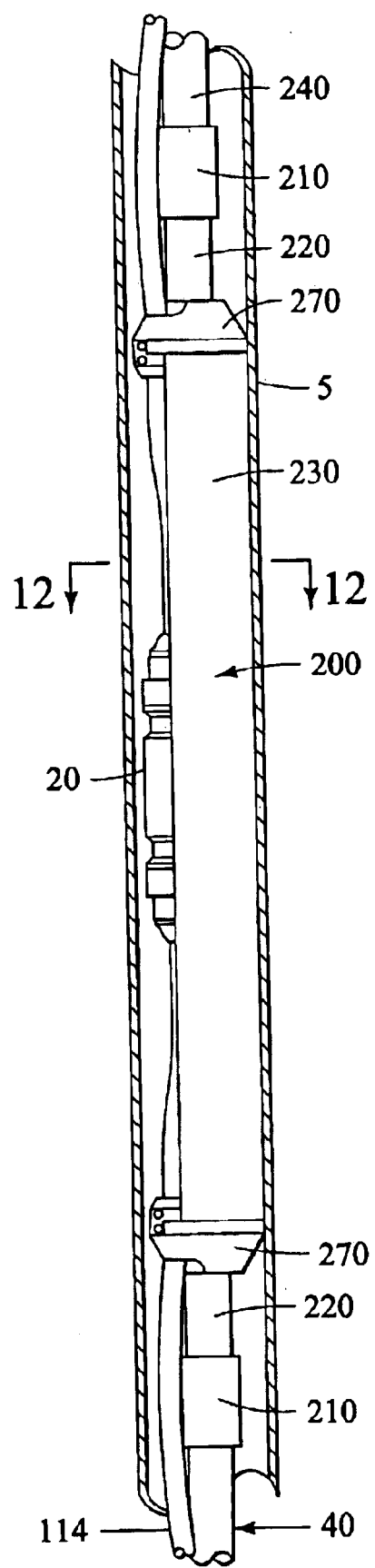
FIG. 11 is side elevation view of an alternate embodiment of the receiver array shown in FIG. 7.
Figure 12:
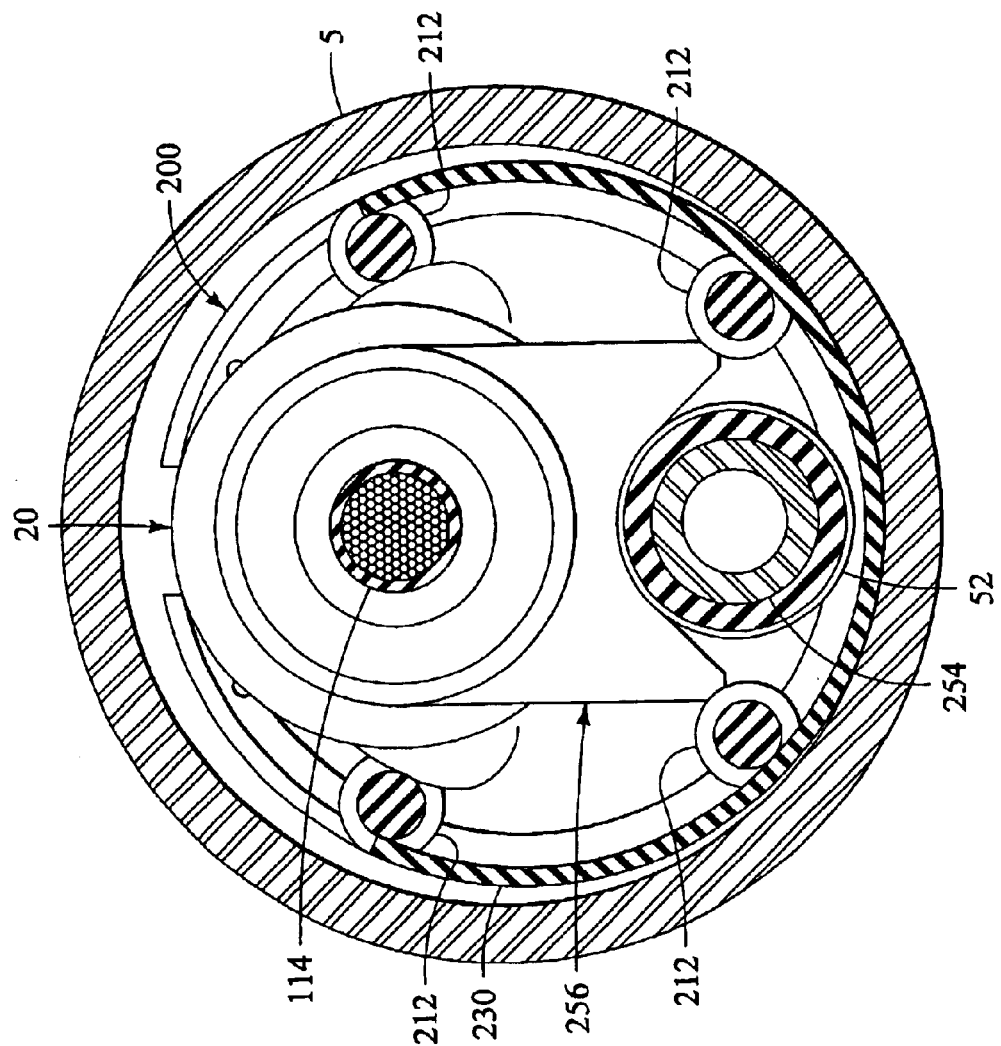
FIG. 12 is a top sectional view of the receiver array shown in FIG. 11.
Figure 13:
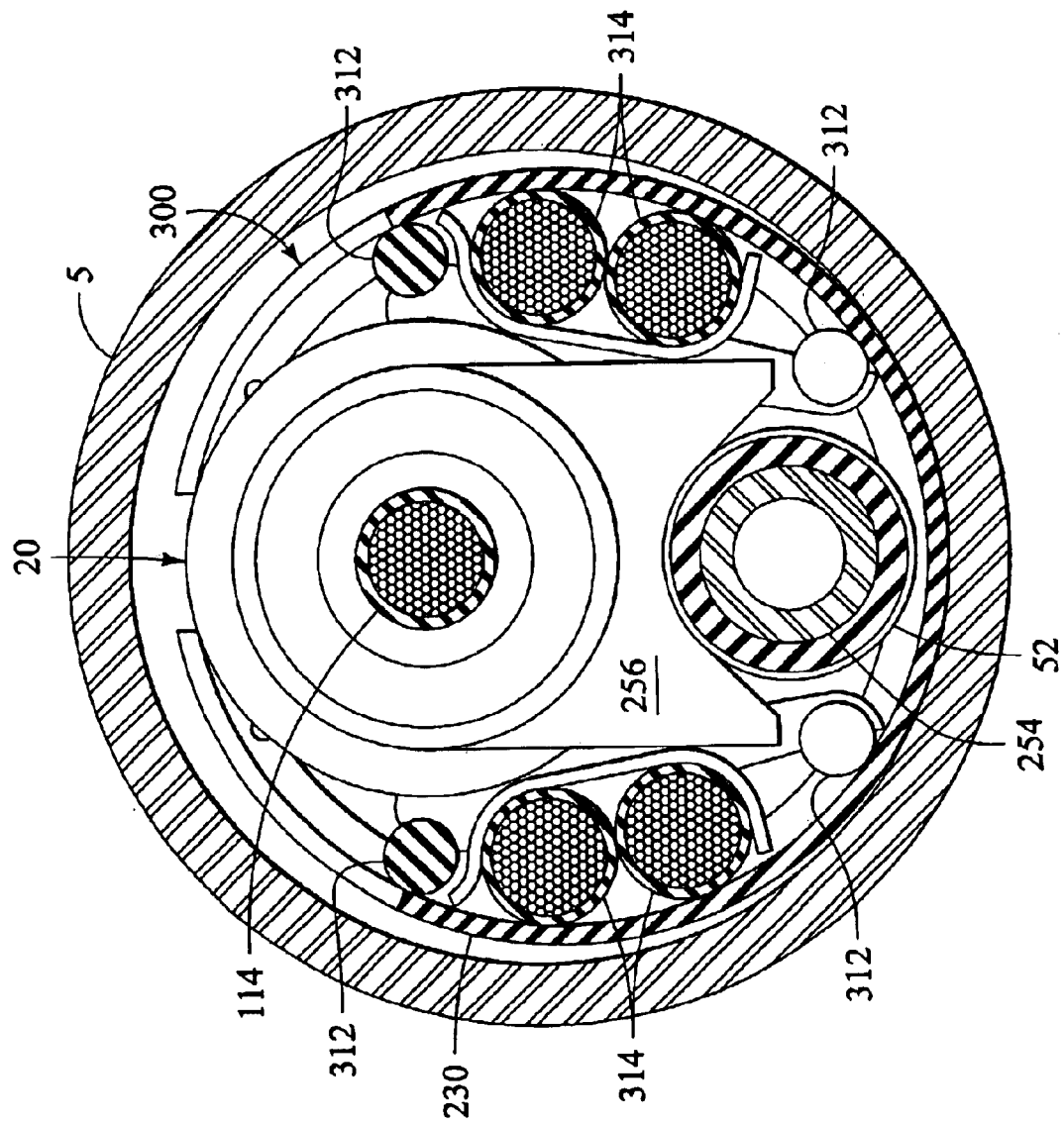
FIG. 13 is a top sectional view of an alternate embodiment of the receiver array shown in FIG. 12.

Another embodiment of an apparatus in accordance with the present invention is shown in FIGS. 11–13. FIG. 11 depicts a receiver array 200 which is similar to the receiver array 10 depicted in FIGS. 7 and 8. The main similarity between the array 10 depicted in FIG. 8 and the array 200 depicted in FIG. 12 is the housing 130 and 230 (respectively) which surrounds the geophone pod 20. The primary difference between the array 10 depicted in FIGS. 7 and 8 the array 200 depicted in FIGS. 11 and 12 is that the array 10 in FIG. 7 uses an off-center coiled tubing section 112 to conduct the fluid in the fluid conduit 40, while the array 200 in FIG. 11 uses production tubing sections 240 which are centered within the wellbore to conduct the fluid in the fluid conduit 40.

In the receiver array 200 depicted in FIG. 11, the production tubing sections 240 can be coupled to the expansible section (not shown in FIG. 11) using standard tubing collars 210. These standard tube collars 210 have reverse threaded ends, allowing the coupling 210 to be turned to disconnect the production tubing section 240, without necessitating turning the tube section 240 or the geophone pod housing 230, as was described above.

The tube collars 210 are connected to pod housing conduit extensions 220, which are in turn welded or otherwise attached to the pod housing end caps 270. The signal cable 114 can be secured to the pod housing end caps 270 to relieve tension in the cable and impart the force to the end caps 270, and consequently to the production tubing 240. Fluid passing through pod housing conduit extensions 220 can be routed to the inner fluid conduit 254 (shown in FIG. 12). Since the pod housing conduit extension 220 is essentially centered with respect to the wellbore, whereas the inner fluid conduit (254, FIG. 12) is located proximate to one side of the wellbore, the two are connected by a piece of fluid conduit (not shown) having an offset or a slight bend.

Turning now to FIG. 12, the receiver array 200 includes an expansible section within the fluid conduit 40 of FIG. 11. The expansible section includes an inner conduit 254 and an expansible sleeve 52. The portion of the inner fluid conduit 254 which is covered by the expansible sleeve 52 can be perforated, allowing fluid to expand the expansible sleeve 52 in the manner described above. However, unlike the embodiment described above, the inner conduit 254 does not function as a primary tensile strength member. Rather, the receiver array 200 employs tensile members 212 which are connected to the upper and lower end caps 270, thus communicating the weight of the geophone pods 20 and the signal cable 114 to the production tubing sections 240. One method of connecting the tensile members 212 to the end caps 270 is by welding.

In one example the outside diameter of the geophone pod housing 230 is sized to be approximately 0.5 inches (12 mm) less than the inside diameter of the wellbore casing 5. This has the effect of reducing pressure waves which can occur in the wellbore during use of the receiver array 200. Such pressure waves (or "tube waves") are recognized as a primary source of signal noise during down-hole seismic surveys, and therefore reducing the magnitude of such tube waves has a beneficial effect on the results of a survey taken using the downhole receiver array 200.

In operation, as fluid is pumped through the fluid conduit 254 at a pressure higher than the pressure in the wellbore, the expansible sleeve 52 expands, pushing against the inner wall of the pod housing 230 and the pod shoe 256. The pod shoe 256 pushes the geophone pod 20 against the inner wall of the well casing 5 to couple the geophone pod to the well casing. After the desired data has been recorded, the fluid pressure within the fluid conduit 254 is relieved, allowing the expansible sleeve 52 to contract and the geophone pod 20 to retract back into the pod housing 230.

FIG. 13 depicts an alternate embodiment of the receiver array 200 depicted in FIG. 12. The receiver array 300 of FIG. 13 includes four additional signal cables 314 in addition to the receiver cable 114, providing five signal cables in all. These signal cables 314 can be connected in signal communication with geophone pods which are intended to be positioned deeper within the wellbore than is the receiver 20 shown in FIG. 13. For example, in a receiver array having 100 geophone pods, a first cable 314 can be connect to the first twenty geophone pods, a second cable 314 to the second twenty geophone pods, and so on to the fifth cable 114. This allows data to be transmitted at a faster rate than using a single cable, and allows for improved signal quality over multiplexing data on a single cable.

Figure 14:
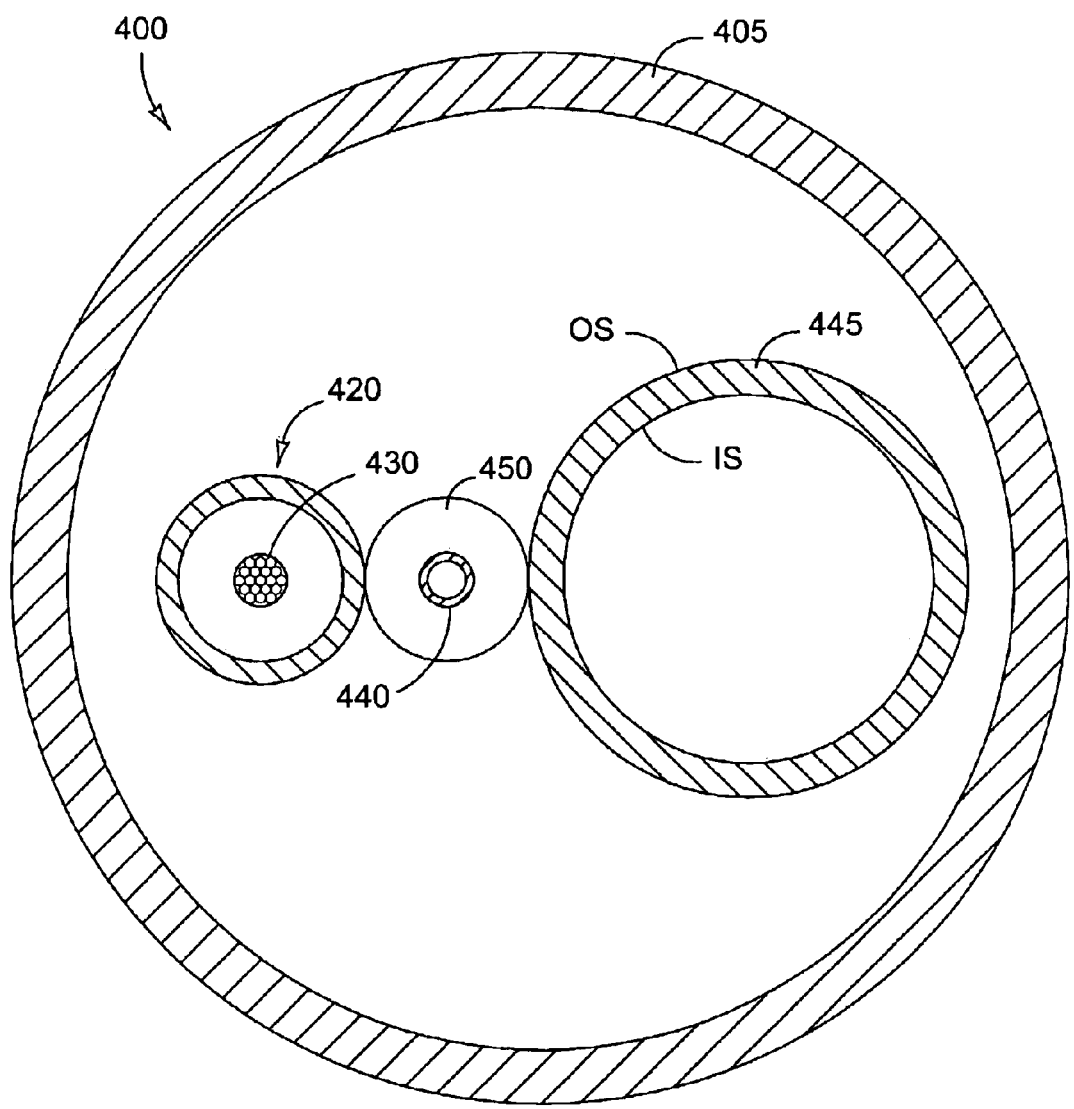
FIG. 14 is a top sectional view of a receiver array in accordance with another embodiment of the present invention deployed within a borehole.

Attention is directed now to FIG. 14, which depicts a top sectional view of a receiver array 400 according to an alternative embodiment of the present invention. As shown, the receiver array 400 is received within a borehole casing 405. Further received within the borehole casing 405 is a production tubing 445. The production tubing 445 is defined by an inner surface IS and an outer surface OS, and is typically used to convey fluid (such as, for example, crude oil or natural gas) drawn from an underground source (not shown) to a surface location (not shown) for collection, processing, and/or other use. As such, the production tubing 445 is defined by any suitable fluid conduit for conveying the particular fluid, and is typically formed from steel pipe. Other materials can be used to form the production tubing 445.

The receiver array 400 includes a plurality of receivers 420 arranged in a sequential series and exemplified in FIG. 14 by a single unit. Each receiver 420 is coupled to the next receiver 420 (not shown) in the series by way of a section of signal cable 430. Each receiver 420 and signal cable 430 is defined, configured, and cooperative substantially as described above in regard to the receiver 20 and the signal cable 30, respectively, of FIGS. 1–3.

The receiver array 400 further includes a fluid conduit 440 and a plurality of expansible sections 450. The fluid conduit 440 and each expansible section 450 is defined, configured, and cooperative substantially as described above in regard to the fluid conduit 40 and the expansible section 50, respectively, of FIGS. 1–3. The plurality of expansible sections 450 are generally numbered in one-to-one correspondence to the plurality of the receivers 420. For example, an embodiment of the receiver array 400 can include fifty receivers 420 and a corresponding fifty expansible sections 450. Other embodiments of the receiver array 400 including different corresponding numbers of receivers 420 and expansible sections 450 can be used.

Typical operation of the receiver array 400 is substantially as follows: The expansible sections 450 of the receiver array 400 are selectively expanded by remote operation (described in further detail hereafter). The selective expansion of the expansible sections 450 results in the forced separation of the receivers 420 away from the production tubing 445, bringing the receivers 420 into contact with the borehole casing 405. The expansible sections 450 then maintain the receivers 420 in contact with the borehole casing 405 during operation of the receiver array 400. The expansible sections 450 can then be selectively contracted under remote control so as to move the receivers 420 away from the borehole casing 405, in preparation, say, for removing the receiver array 400 from the borehole casing 405. Further operative detail of the receiver array 400 is substantially as described hereafter in the Operation section.

Figure 15:
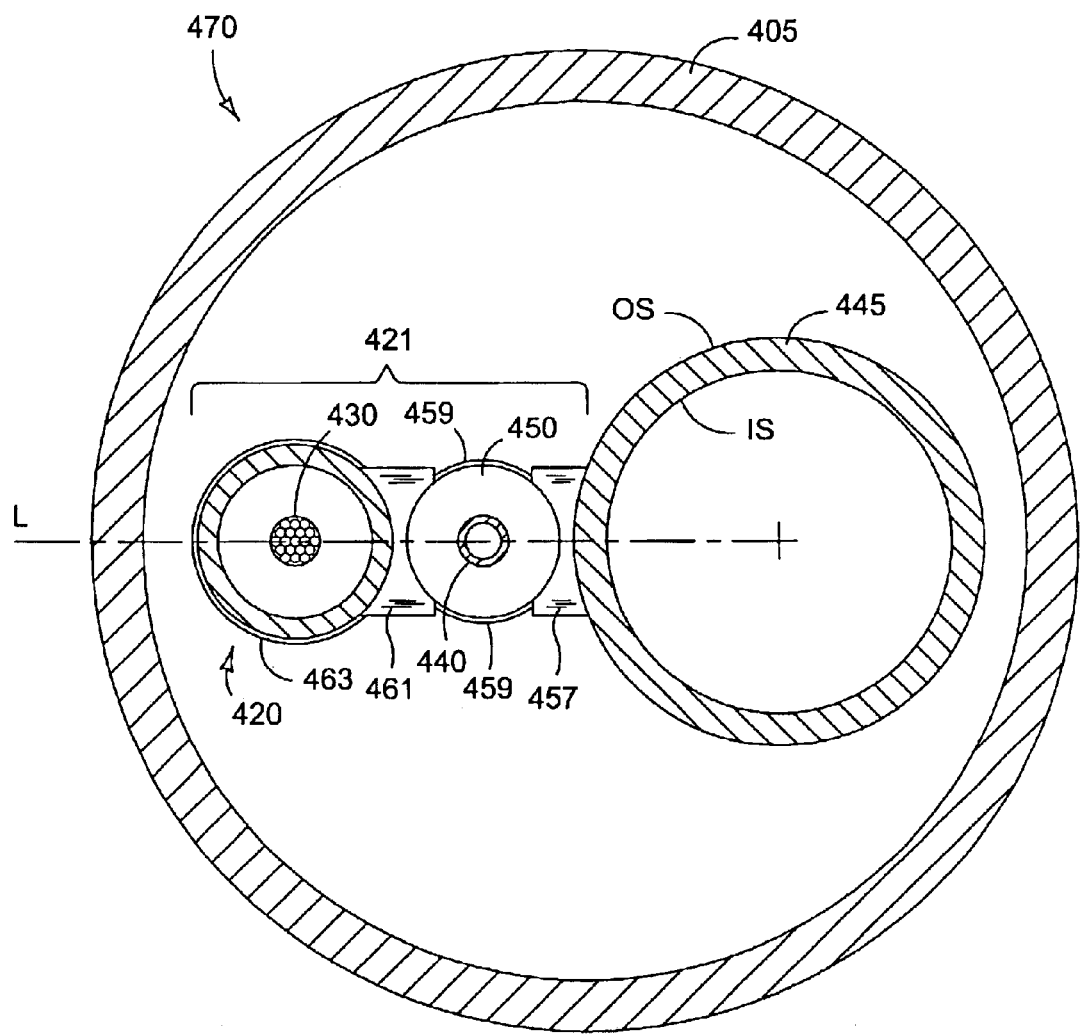
FIG. 15 is a top sectional view of a receiver array in accordance with yet another embodiment of the present invention deployed within a borehole.

FIG. 15 depicts a top sectional view of a receiver array 470 according to another embodiment of the present invention. The receiver array 470 includes the plurality of receivers 420, plurality of signal cables 430, the fluid conduit 440, and plurality of expansible sections 450 defined and configured as described above in regard to FIG. 14. Furthermore, FIG. 15 depicts the borehole casing 405 and the production tubing 445 of FIG. 14.

The receiver array 470 further includes a plurality of expansible section saddles (i.e., production tubing contacting members) 457. Each expansible section saddle 457 has a generally double-concave cross-section, and is disposed between, and in mutual contact with, an associated expansible section 450 and the production tubing 445. The expansible section saddle 457 can be formed of any suitable material, such as, for example, aluminum. The double-concavity of the expansible section saddle 457 is selected to approximate (i.e., accommodate) the respective outer radiuses of the expansible section 450 and the production tubing 445. The expansible section saddle 457 is removably supported by the associated expansible section 450 by way of an expandable belt 459. The expandable belt 459 is formed from any suitable material having sufficient elasticity to accommodate the selective expansion and contraction of the expansible section 450 during typical operation of the receiver array 470 (described in further detail hereafter). Generally, all of the expansible section saddles 457 within the receiver array 470 are mutually identical.

The receiver array 470 further includes a plurality of receiver saddles (i.e., receiver contacting members) 461. Each receiver saddle 461 has a generally double-concave cross-section, and is disposed between, and in mutual contact with, an associated receiver 420 and expansible section 450. The receiver saddle 461 can be formed of any suitable material such as, for example, aluminum. The double-concavity of the receiver saddle 461 is selected to approximate (i.e., accommodate) the respective radiuses of the associated receiver 420 and the associated expansible section 450, during typical operation. The receiver saddle 461 is supported by the receiver 420 by way of one or more attachment belts 463. The attachment belt or belts 463 is/are formed from any suitably elastic material that facilitates removable installation of the receiver saddle 461 on the receiver 420. Generally, all of the receiver saddles 461 within the receiver array 470 are mutually identical.

The expansible section saddles 457 and the receiver saddles 461 operate to maintain the receivers 420, the expansible sections 450 and the production tubing 445 in a substantially parallel, linear alignment along the reference line L. In this way, the receivers 420 can be selectively moved generally along the line L and into contact with the borehole casing 405 in response to the remotely-operated expansion of the expansible sections 450. Furthermore, the receivers 420 can be selectively moved away from the borehole casing 405 in response to the remotely-operated contraction of the expansible sections 450.

Figure 16:
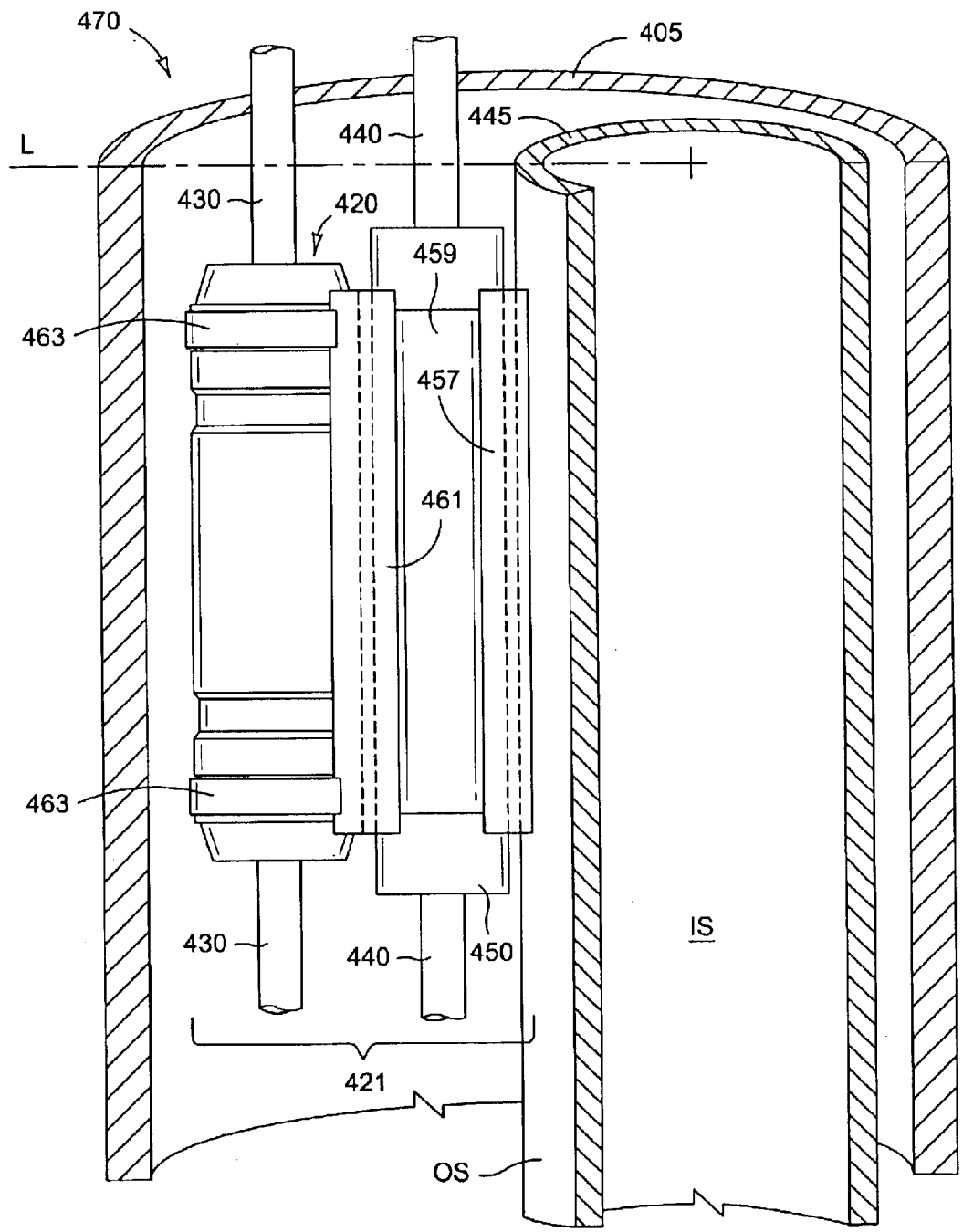
FIG. 16 is a side elevation sectional view of the receiver array shown in FIG. 15.

The receiver array 470 can be considered to include a plurality of receiver groupings 421, with each receiver grouping 421 including a single receiver 420, a single receiver saddle 461, a single expansible section 450, and a single expansible section saddle 457. Thus, the number of receiver groupings 421 is in correspondence (i.e., equal) to the number of the receivers 420 within the receiver array 470. Reference is now directed to FIG. 16 for further understanding of the receiver array 470.

FIG. 16 is a side elevation sectional view of a receiver grouping 421 of the receiver array 470 described above in regard to FIG. 15. As described above, the receiver 420 and the expansible section 450 and the production tubing 445 are respectively disposed in a substantially parallel, linear alignment along the line L as a result of the respective guiding operations of the expansible section saddle 457 and the receiver saddle 461 of the receiver grouping 421.

Figure 16A:
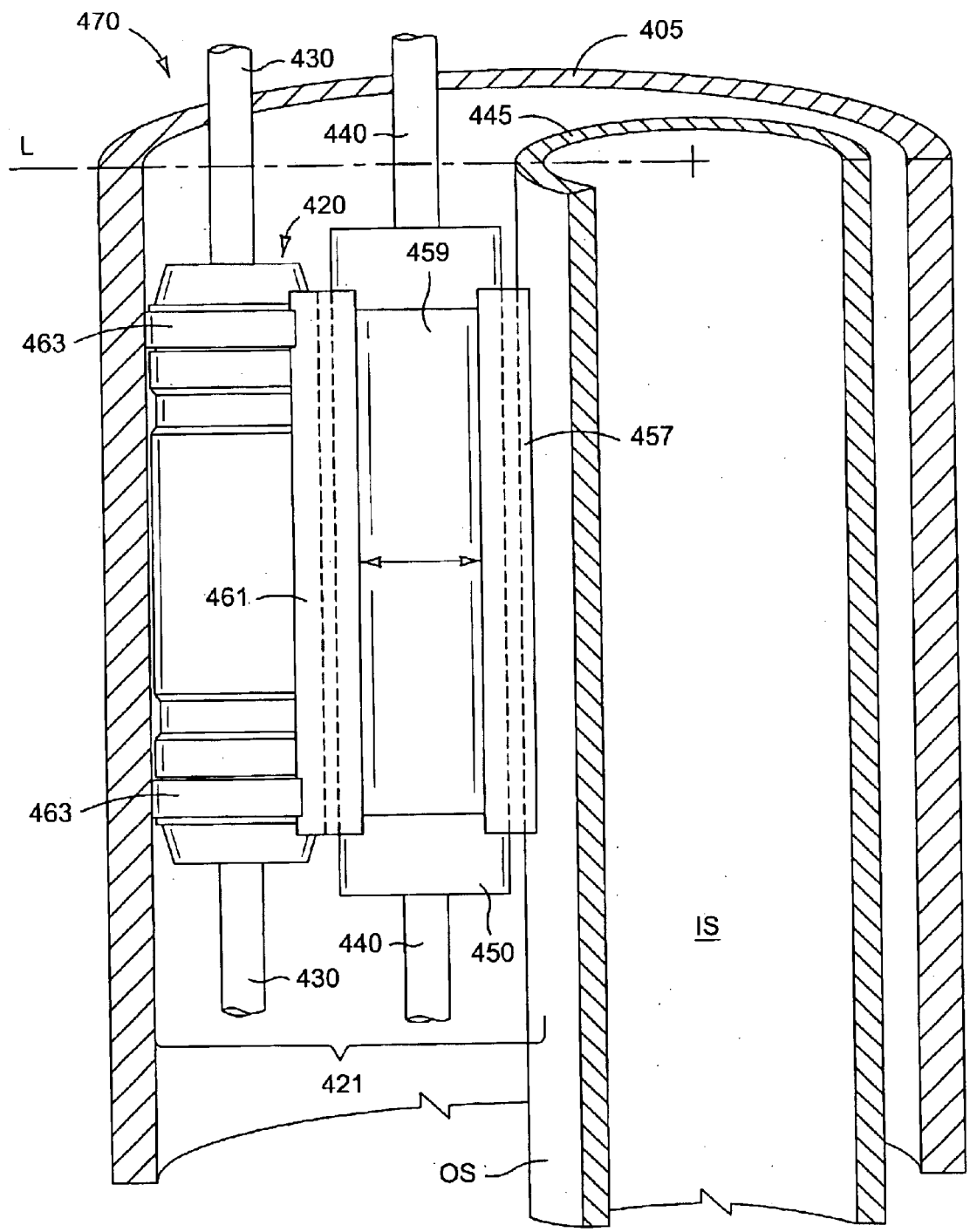
FIG. 16A is a side elevation sectional view of the receiver array shown in FIG. 15, in a typical operative condition.

FIG. 16A depicts typical operation of the receiver array 470 described above. As shown, the receiver 420 is moved into contact with the borehole casing 405 in response to selective, remotely-controlled expansion of the expansible section 450 of the receiver grouping 421. The receiver 420 is maintained in contact with the borehole casing 405 during operation of the receiver array 470, with the receiver saddle 461 and the expansible section saddle 457 serving to maintain substantially parallel, linear alignment of the elements of the receiver grouping 421 during operation.

It is to be understood that the operative description of FIG. 16A is typical of each of the receiver groupings 421 of the receiver array 470. As such, each of the plurality of receivers 420 of the receiver array 470 are moved toward, maintained in contact with, and moved away from the borehole casing 405 substantially in unison, in accordance with the selective expansion and contraction of the plurality of expansible sections 450. Additional operative detail of the receiver array 470 is generally as described hereafter in the Operation section.

Operation

Returning to FIG. 1, as described previously, the apparatus is preferably actuated by inflating the expansible sections 50 to cause the receivers 20 to be pressed against the casing 5. This can be accomplished by increasing the pressure within the fluid conduit 40 to a pressure beyond that inside the wellbore 4, thus causing the expansible sections to expand. In a first embodiment, a static fluid can be maintained within the fluid conduit 40 having a pressure maintained by a pressure source 7 of FIG. 1 which can comprise a pump or a compressor.

More preferably, a fluid is circulated within the fluid conduit 40. In this embodiment, the lower-most end 126 of the fluid conduit 40 is provided with a flow restrictor 15. The flow restrictor can comprise a valve configured to close when the pressure within the fluid conduit rises to a certain preselected pressure. More preferably, the flow restrictor 15 comprises a fused valve configured to close at a preselected differential pressure between the pressure within the fluid conduit 40 and the wellbore 4. The apparatus 100 can be actuated by increasing the pressure of fluid within the fluid conduit 40 by fluid pressure source 7 for example. The fused valve 15 advantageously provides a fast acting response to pressure increases within the fluid conduit 40. When the expansible sections 50 have been actuated, the receivers are caused to move towards the casing 5 as shown in FIG. 6. Once the pressure within the fluid conduit 40 drops below a preselected pressure differential with the pressure in the wellbore 4, the fused valve 15 opens allowing fluid to be circulated through the fluid conduit 40.

When the apparatus is deployed in a reservoir in which the borehole is filled with a liquid fluid, it is preferable to use the same liquid fluid within the fluid conduit as the working fluid in the wellbore to expand the expansible sections. This provides a pressure balanced system prior to closing the valve 15, which is beneficial to the proper functioning of the packers 52. In other applications, the apparatus can be deployed within a wellbore in which a gaseous fluid is contained, as for example in a natural gas field. In this application, it is preferably to use a gaseous fluid within the fluid conduit as the working fluid to expand the expansible sections.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. An apparatus for detecting geophysical energy, comprising:
   a receiver configured to receive geophysical energy characterized by a plurality of characteristics, and convert said geophysical energy into a signal representative of at least one characteristic of said geophysical energy;
   a signal transport device configured to accept said signal and relay said signal to a remote location;
   a fluid conduit configured to contain a pressurized fluid;
   a production tubing; and
   an expansible section disposed in-line in the fluid conduit and positioned between the production tubing and the receiver, the expansible section being configured to expand in response to an increase of fluid pressure within said conduit, and when expanded, to press against the production tubing and the receiver and thereby cause the receiver to be moved from a first position to a second position.

2. The apparatus of claim 1, and further comprising a selectively actuatable flow restrictor fitted to the fluid conduit and configured to selectively restrict fluid flow in the fluid conduit and thereby produce a fluid pressure increase in the fluid conduit.

3. The apparatus of claim 1, and further comprising a receiver contacting member positioned between the expansible section and the receiver, and wherein the receiver contacting member is shaped to substantially contact the expansible section and the receiver when the expansible section is expanded.

4. The apparatus of claim 3, and wherein the receiver contacting member includes at least one attachment belt configured to removably support the receiver contacting member in substantially fixed contact with the receiver.

5. The apparatus of claim 1, and further comprising a production tubing contacting member positioned between the expansible section and the production tubing, and wherein the production tubing contacting member is shaped to substantially contact the expansible section and the production tubing when the expansible section is expanded.

6. The apparatus of claim 5, and wherein the production tubing contacting member includes at least one expandable belt configured to removably support the production tubing contacting member in substantially continuous contact with the expansible section.

7. The apparatus of claim 1, and wherein:
   the fluid conduit is defined by an outer surface and an interior surface;
   an opening is defined in the fluid conduit between the outer surface and the inner surface; and
   the expansible section comprises an expansible sleeve fitted over the outer surface and the opening in the fluid conduit.

8. The apparatus of claim 1, and wherein the signal transport device is a signal cable, the apparatus further comprising a positioning device configured to secure the signal cable, the fluid conduit, and the production tubing in relatively fixed position to one another.

9. The apparatus of claim 1, and further comprising:
   a plurality of receivers, each receiver configured to receive geophysical energy characterized by a plurality of characteristics, and convert said geophysical energy into a signal representative of at least one characteristic of said geophysical energy;
   a plurality of expansible section periodically disposed in-line in the fluid conduit, each expansible section being positioned between the production tubing and an associated receiver, the expansible sections being configured to expand in response to an increase of fluid pressure within said conduit, and when expanded, to press against the production tubing and the receivers and thereby cause the receivers to be moved from first positions to second positions; and
   wherein the plurality of receivers are in signal communication with the signal transport device.

10. The apparatus of claim 9, and further comprising a plurality of receiver contacting members and a plurality of production tubing contacting members, and wherein each receiver contacting member is supported between a corresponding receiver and a corresponding expansible section by way of the corresponding receiver, and wherein each production tubing contacting member is supported between a particular expansible section and the production tubing by way of the particular expansible section, and wherein the plurality of receiver contacting members and the plurality of production tubing contacting members are configured to maintain a substantially parallel linear alignment of the plurality of receivers and the plurality of expansible sections and the production tubing as the receivers are moved from the first positions to the second positions.

11. A method of deploying a receiver in a wellbore, compromising:
   placing a production tubing in the wellbore;
   placing a fluid conduit in the wellbore;
   placing an expansible section in-line in the fluid conduit proximate the production tubing;
   placing a receiver in the wellbore proximate the expansible section; and
   increasing pressure of a fluid in the fluid conduit to cause the expansible section to expand and press against the production tubing and the receiver, to thereby urge the receiver from a first position to a second position.

12. The method of claim 11, and further comprising restricting flow of fluid in the fluid conduit to cause the increase of pressure of the fluid in the fluid conduit.

13. The method of claim 11, and further comprising conveying a chemical through the fluid conduit.

14. The method of claim 11, and further comprising conveying steam through the fluid conduit.

15. The method of claim 11, and further comprising maintaining the receiver and the expansible section and the production tubing in a substantially parallel linear alignment during the urging the receiver from the first position to the second position using a receiver contacting member and a production tubing contacting member respectively supported by the receiver and the expansible section.

16. The method of claim 11, and further comprising:
   placing a plurality of expansible sections periodically in-line in the fluid conduit, each expansible section being placed proximate the production tubing;
   placing a plurality of receivers in the wellbore, each receiver being placed proximate an associated expansible section; and increasing pressure of the fluid in the fluid conduit to cause the plurality of expansible sections to expand and press against the production tubing and the associated receivers, to thereby urge the receivers from first positions to second positions.

17. The method of claim 16, and further comprising maintaining the plurality of receivers and the plurality of expansible sections and the production tubing in a substantially parallel linear alignment during the urging the receivers from the first positions to the second positions using a plurality of receiver contacting members and a plurality of production tubing contacting members respectively supported by corresponding ones of the receivers and corresponding ones of the expansible sections.

* * * * *